United States Patent
Xu et al.

(10) Patent No.: US 12,123,972 B2
(45) Date of Patent: Oct. 22, 2024

(54) METHOD AND SYSTEM FOR IMPORTING PARAMETER CALIBRATION AND TERMINAL DEVICE

(71) Applicants: Zhengzhou Wanmayun Electronic Technology CO.,Ltd., Zhengzhou (CN); HONGFUJIN PRECISION ELECTRONICS (ZHENGZHOU) CO., LTD., Zhengzhou (CN)

(72) Inventors: Hai-Tao Xu, Zhengzhou (CN); Jian-Guo Chan, Zhengzhou (CN)

(73) Assignees: Zhengzhou Wanmayun Electronic Technology CO., Ltd., Zhengzhou (CN); HONGFUJIN PRECISION ELECTRONICS (ZHENGZHOU) CO., LTD., Zhengzhou (CN)

( * ) Notice: Subject to any disclaimer, the term of this patent is extended or adjusted under 35 U.S.C. 154(b) by 457 days.

(21) Appl. No.: 17/534,726

(22) Filed: Nov. 24, 2021

(65) Prior Publication Data
US 2023/0003834 A1 Jan. 5, 2023

(30) Foreign Application Priority Data
Jun. 30, 2021 (CN) ............ 202110739834.4

(51) Int. Cl.
*G01S 7/40* (2006.01)
*G01S 13/02* (2006.01)

(52) U.S. Cl.
CPC ........ *G01S 7/4008* (2013.01); *G01S 13/0209* (2013.01)

(58) Field of Classification Search
CPC .................. G01S 7/4008; G01S 13/0209
See application file for complete search history.

(56) References Cited

U.S. PATENT DOCUMENTS

| | | | |
|---|---|---|---|
| 2009/0241360 A1* | 10/2009 | Tait ............ | G01B 21/042 33/502 |
| 2013/0179108 A1* | 7/2013 | Joseph ............ | G01D 18/00 702/104 |
| 2014/0365640 A1* | 12/2014 | Wohl ............ | A41D 1/04 709/224 |
| 2015/0054621 A1* | 2/2015 | Lin ............ | G06K 7/10198 235/494 |
| 2021/0231493 A1* | 7/2021 | Dunning ............ | G01N 21/31 |
| 2022/0289141 A1* | 9/2022 | Shah ............ | B60R 16/023 |

* cited by examiner

*Primary Examiner* — Bernarr E Gregory
*Assistant Examiner* — Hailey R Le
(74) *Attorney, Agent, or Firm* — ScienBiziP, P.C.

(57) ABSTRACT

The present disclosure provides a parameter calibration importing method for importing calibration parameter into an UWB module, the parameter calibration importing method includes determining the calibration parameter according to requirements of the UWB module, storing the calibration parameters, and writing the corresponding calibration parameters into an UWB chip according to the identity information. Wherein the calibration parameter is associated with identity information of the UWB module.

12 Claims, 6 Drawing Sheets

METHOD AND SYSTEM FOR IMPORTING PARAMETER CALIBRATION AND TERMINAL DEVICE

TECHNICAL FIELD

The present disclosure relates to the technical field of parameter calibration, in particular to method and system for importing parameter calibration, and terminal device.

BACKGROUND

In the production process of an ultra wideband (UWB) module, the RF parameters such as transmission power and signal frequency in the UWB module are usually written into the UWB chip at one time.

After the RF parameters are entered into the UWB chip by one-time writing, the UWB module still needs to be processed to finally become a usable finished product. In the subsequent processing process, if the UWB module is not processed properly, it is easy to cause the UWB module to eventually become a defective product. The UWB chip with parameters entered after one-time writing may be scrapped at the same time as the defective product, resulting in a waste of UWB chip.

Therefore, improvement is desired.

DETAILED DESCRIPTION

The technical solutions in the embodiments of the present disclosure will be described clearly and completely in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

Figure 1:
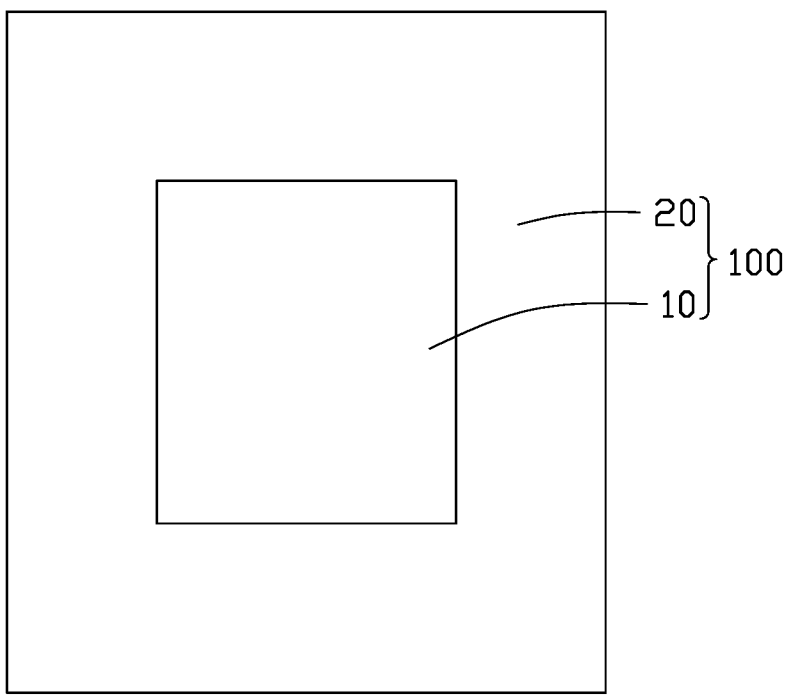
FIG. 1 is a schematic diagram of an UWB module according to an embodiment of the present disclosure.

FIG. 1 is a schematic diagram of the ultra wideband (UWB) module 100 of the present disclosure.

The UWB module 100 includes an UWB chip 10 and a motherboard 20. The UWB chip 10 is mounted on the motherboard 20. The UWB chip 10 is electrically connected with a peripheral circuit on the motherboard 20, and RF parameters can be written into the UWB chip 10 in the form of one-time writing.

The RF parameters of the UWB module 100 are parameters that affect the service performance of the UWB module 100. The RF parameters can include but be not limited to UWB transmission power, signal frequency error value, delay time.

Figure 2:
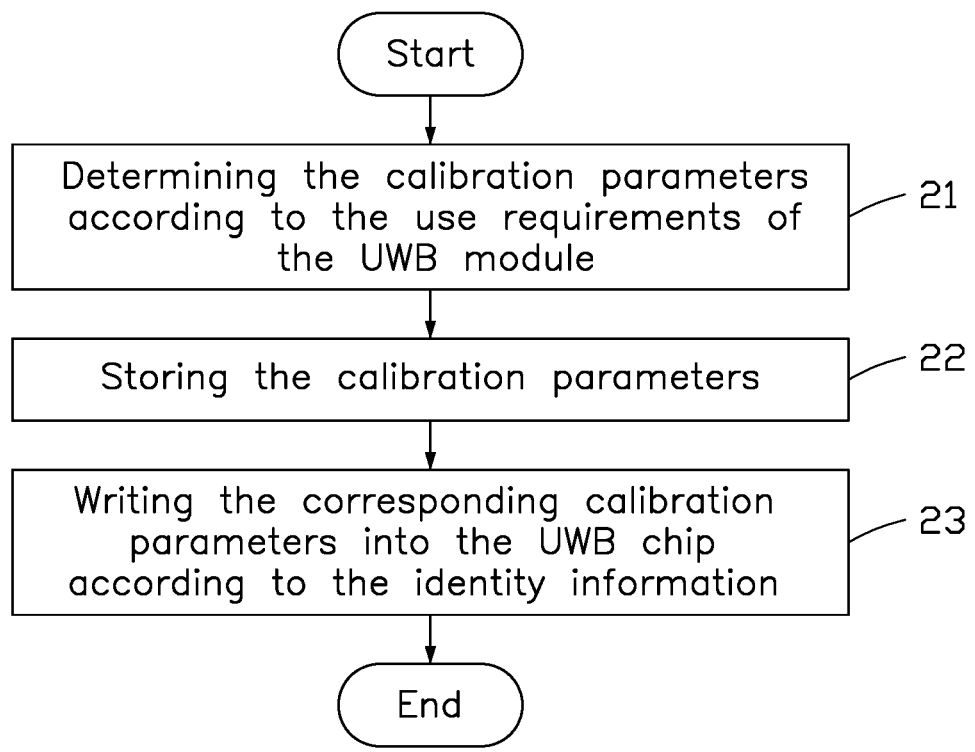
FIG. 2 is a flowchart of a parameter calibration importing method according to an embodiment of the present disclosure.

FIG. 2 is a flowchart depicting an embodiment of a method for importing parameter calibration. The method is provided by way of example, as there are a variety of ways to carry out the method.

Each block shown in FIG. 2 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 21.

At block 21, determining the calibration parameters according to the use requirements of the UWB module 100.

The use requirements of the UWB module 100 may include the assembly equipment, geographical location, altitude, air humidity, ambient temperature, use time and other factors of the UWB module 100. For example, the use requirements of the UWB module 100 can be used to assemble on a base station located in Gobi.

The calibration parameter is the RF parameter of the UWB module 100 under the specified use demand. Under different use requirements, the performance of the UWB module 100 is different, the good product judgment standard of the UWB module 100 is different, and the RF parameters of the UWB chip 10 are different.

Figure 3:
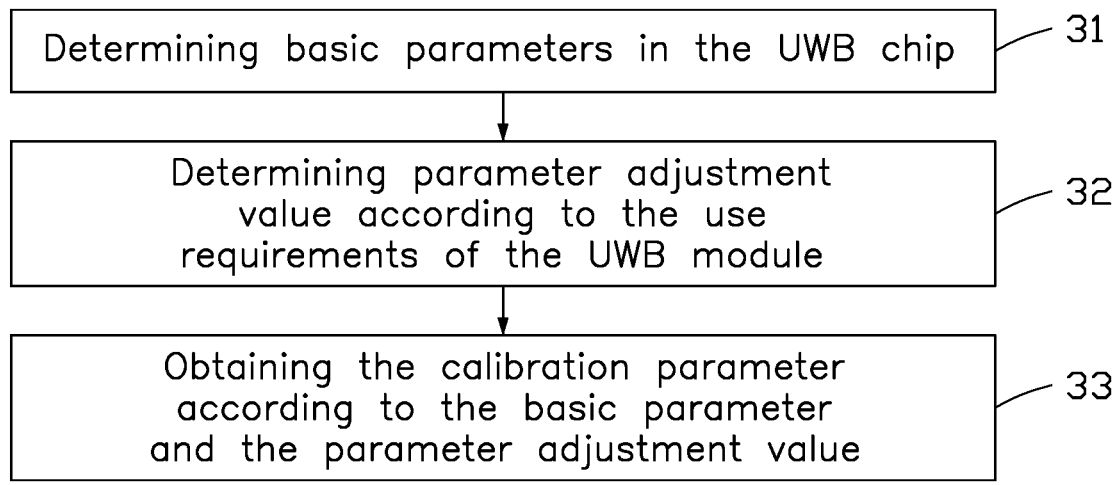
FIG. 3 is a flowchart of a parameter calibration importing method according to another embodiment of the present disclosure.

Referring to FIG. 3, in one embodiment, a specific method for determining the calibration parameters may include the following steps:

At block 31, determining basic parameters in the UWB chip 10.

It can be understood that for the UWB module 100 in production, the UWB chip 10 can be the newly produced UWB chip 10 or the factory set UWB chip 10. The RF parameters in the UWB chip 10 maintain the value in the initialization state. At this time, the RF parameters of the UWB chip 10 are the basic parameters.

In one embodiment, the UWB chips 10 applicable to the same use requirements are all the UWB chips 10 of the same model, and the UWB module 100 applicable to the same use demand is the UWB module 100 of the same model. Ideally, the basic parameters of multiple UWB chips 10 of the same model are consistent. However, due to the limitations of the production process in the actual production process, the basic parameters of multiple UWB chips 10 will be different due to the subtle differences in circuit layout, materials, etc. in the UWB chip 10. However, when the RF parameters of the plurality of UWB chips 10 correspond to the basic parameters, the service performance of the plurality of UWB chips 10 is close to the same, and the service performance of the plurality of UWB modules 100 is also close to the same.

At block 32, determining parameter adjustment value according to the use requirements of the UWB module 100.

It can be understood that the service performance of the plurality of UWB modules 100 is nearly consistent under the corresponding plurality of basic parameters. Therefore, in order to adjust the use performance of the plurality of UWB modules 100 to match the use needs, the basic parameters of the plurality of UWB chips 10 can be adjusted by the same value. For example, the delay time of the plurality of UWB chips 10 is increased by 0.5 seconds. The value of the basic parameter adjustment for the plurality of UWB chips 10 is the parameter adjustment value. For the same use requirements, the reference adjustment values corresponding to the plurality of UWB chips 10 are the same.

In one embodiment, a plurality of RF parameters can exist in one UWB chip 10. When the UWB chip 10 is in the initialization state, there are a plurality of the reference parameters in the UWB chip 10. For each of the reference parameters, there is a corresponding parameter adjustment value. For example, the delay time corresponds to the delay time adjustment value, and the UWB transmission power corresponds to the transmission power adjustment value.

At block 33, obtaining the calibration parameter according to the basic parameter and the parameter adjustment value.

In one embodiment, the calibration parameter is obtained by adding the basic parameter and the parameter adjustment value.

The method for adjusting the RF parameters of the UWB chip 10 is to erase the original RF parameters and then write the new RF parameters. The embodiment of the present disclosure can erase the basic parameters and then writes the calibration parameters. Therefore, each UWB chip 10 needs to read the basic parameters and determine the calibration parameters once in the production process, the plurality of UWB chips 10 correspond to different calibration parameters. Similarly, the plurality of UWB modules 100 correspond to different calibration parameters.

Referring to FIG. 2, at block 22, storing the calibration parameters.

It can be understood that in the production process of the UWB module 100, if the calibration parameters are directly written into the UWB chip 10 at one time, and then the subsequent processing of the UWB module 100 is continued, if the motherboard 20 is damaged during subsequent processing, resulting in the UWB module 100 being a defective product, the UWB chip 10 and the motherboard 20 will be scrapped at the same time, resulting in the waste of the UWB 10. Therefore, after determining the calibration parameters corresponding to the UWB module 100, the calibration parameters can be stored first. When the UWB module 100 is finally produced and determined to be good, the calibration parameters are written into the UWB chip 10. If the UWB module 100 is finally determined as a defective product, since the parameters in the UWB chip 10 still remain in the initialization state, the UWB chip 10 can be disassembled from the motherboard 20 and applied in the production of other UWB modules 100, reducing the waste of the UWB chip 10.

For example, in the production process of the UWB module 100, when the motherboard 20 is cracked due to incorrect operation in processing, and the UWB chip 10 is normal, and the UWB module 100 is determined as a defective product, the UWB chip 10 can be removed from the motherboard 20, and the removed UWB chip 10 can be used to assemble another UWB module 100.

In one embodiment, while storing the calibration parameters, the identity information of the UWB module 100 corresponding to the calibration parameters is stored.

It can be understood that the plurality of UWB modules 100 correspond to the identity information with different contents. The specific form of the identity information may be, but is not limited to, a serial number, a barcode, etc.

It can be understood that for each UWB module 100, the corresponding identity information is unique, and the verification parameters and the identity information corresponding to the UWB module 100 are associated.

In one embodiment, the stored calibration parameters and the identity information can be permanently stored when the storage space is sufficient, only when the storage space is insufficient, the calibration parameter and the identity information can be deleted from the storage space. The specific method of deleting the calibration parameter and the identity information can be, but is not limited to, selecting and deleting through manual operation, or the storage system automatically selects the calibration parameter and the identity information with the longest storage time, etc.

In another embodiment, the calibration parameters and the identity information are temporary. When the production of the UWB module 100 corresponding to the identity information is completed and the calibration parameters are written into the UWB chip 10, the storage system automatically deletes the calibration parameters and the identity information.

In one embodiment, in order to trace the source of various abnormal conditions in the production process of the UWB module 100. Before determining the verification parameters, the UWB module 100 can be marked with an identification tag. In each subsequent processing step, the relevant information of the marked UWB module 100 can be determined by identifying the identification tag. It can be understood that the relevant information includes but is not limited to the calibration parameters, the identity information, etc. of the UWB module 100.

When storing the calibration parameters and the identity information, the identification tag can be bound with the calibration parameters and the identity information. When the calibration parameters need to be written into the UWB chip 10, the calibration parameters can be obtained by identifying the identification tag.

For example, the specific form of the identification label may be, but is not limited to, a quick response code, a bar code, etc.

At block 23, writing the corresponding calibration parameters into the UWB chip 10 according to the identity information.

The UWB module 100 corresponding to the UWB chip 10 written with the calibration parameters is a good product.

It can be understood that quality inspection is required for the UWB module 100 completing production and processing, and determine whether the structure, performance of the UWB module 100 meet the qualification standard. The UWB module 100 that meets the good product standard is marked as good product, and the UWB module 100 that does not meet the good product standard is marked as defective product.

In one embodiment, the quality inspection of the UWB module 100 is manually realized by the operator, the operator can detect the structural specification, circuit connection of the UWB module 100 through the test instrument, and determine whether the UWB module 100 meets the good product standard through the test results. The operator can move the UWB module 100 that meets the good product standard to the good product area, move the UWB module 100 that does not meet the good product standard to the bad product area, and enter the calibration parameters only for the UWB module 100 located in the good product area.

The quality inspection of the UWB module 100 is automatically completed by a full-automatic production line for the production and processing of the UWB module 100. The full-automatic production line can check the UWB module 100 through inspection devices to determine whether the structural specification and circuit connection of the UWB module 100 meet the good product standard, the inspection devices can be an image acquisition device and electrical test device. The full-automatic production line can move the UWB module 100 that does not meet the good product standard to the defective product area through the transmission device, and move the UWB module 100 that meets the good product standard to the station where the calibration parameters are written through the transmission device. The UWB module 100 located on the station where the calibration parameters are written can be automatically written into the calibration parameters.

In the embodiment, after the UWB module 100 determined as a defective product is manually disassembled, the UWB chip 10 without writing the calibration parameters can be reused in the production of another UWB module 100, to reduce the waste of the UWB chip 10.

Figure 4:
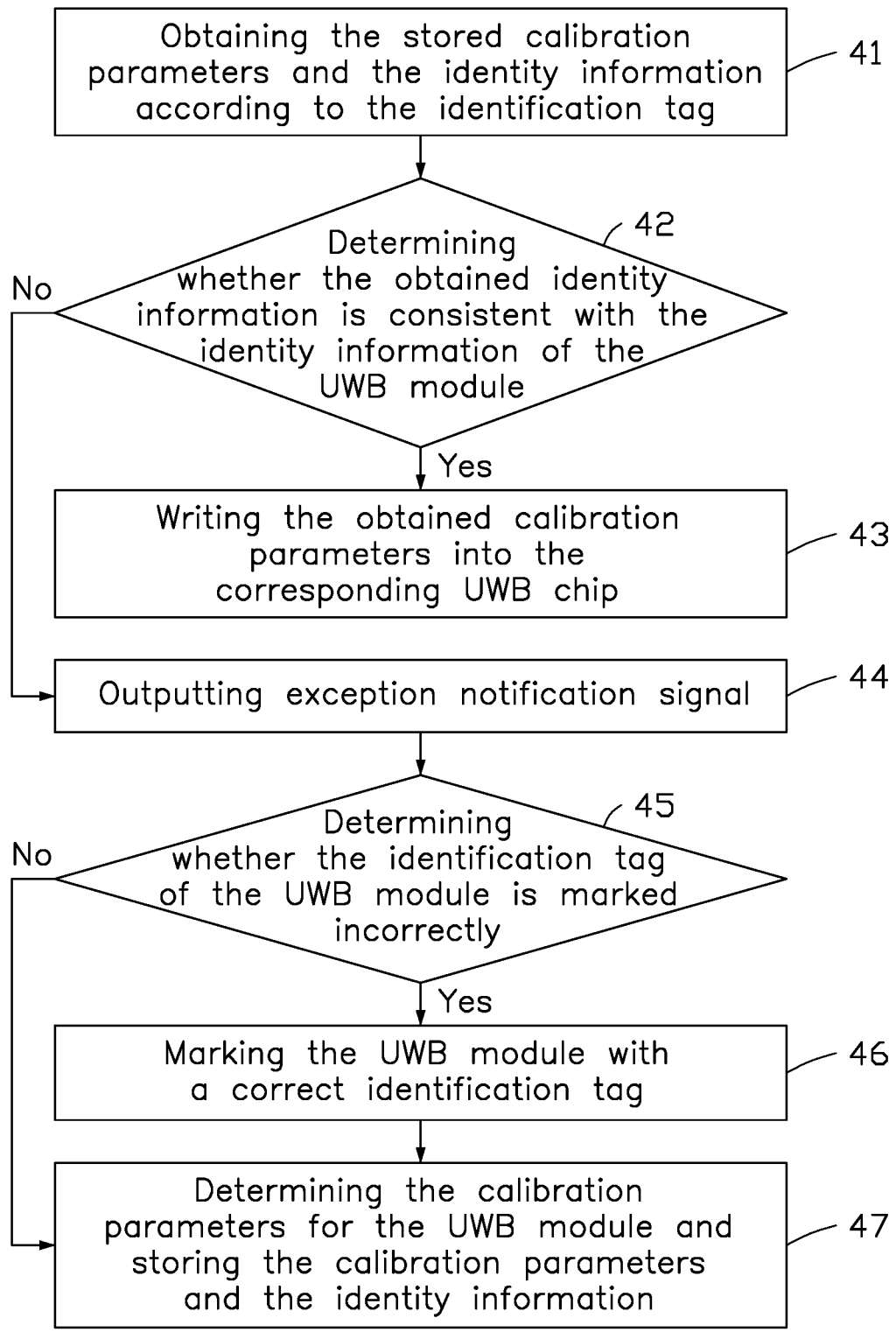
FIG. 4 is a flowchart of a parameter calibration importing method according to another embodiment of the present disclosure.

Referring to FIG. 4, the method of writing the calibration parameters into the UWB chip 10 may include the following steps.

At block 41, obtaining the stored calibration parameters and the identity information according to the identification tag.

It can be understood that when storing the calibration parameters and the identity information, the identification tag can be bound with the calibration parameters and the identity information to facilitate the search of the stored calibration parameters and the identity information.

At block 42, determining whether the obtained identity information is consistent with the identity information of the UWB module 100. If the acquired identity information is consistent with the identity information of the UWB module 100, then block 43 is implemented, otherwise, the block 44 is implemented.

It can be understood that by confirming whether the identity information is consistent with the currently read identity information, it can be determined whether the content bound by the identification tag is incorrect. If it is determined that the content bound by the identification tag is incorrect, it may lead to inconvenient responsibility traceability for the problems in the production process of the UWB module 100. Therefore, it is necessary to determine whether there is a problem with the identification tag before writing the calibration parameters.

At block 43, writing the obtained calibration parameters into the corresponding UWB chip 10.

If the obtained identity information is consistent with the currently read identity information, it is determined that the identification tag is normal, and at this time, the UWB module 100 has been determined as a good product. Therefore, the calibration parameters can be written into the UWB chip 10 to complete the production of the UWB module 100.

In the embodiment, the calibration parameters are written into the UWB chip 10 by one-time writing.

At block 44, outputting exception notification signal.

When it is found that the obtained identity information is inconsistent with the currently read identity information, the identification tag may have an exception, or there may be an exception in the step of storing the identity information, and an exception notification signal can be output to notify the staff to check and determine the cause of the exception.

At block 45, determining whether the identification tag of the UWB module 100 is marked incorrectly. If the identification tag of the UWB module 100 is marked incorrectly, then block 46 is implemented, otherwise, the block 47 is implemented.

When it is found that the obtained identity information is inconsistent with the currently read identity information, the problem may be the identification label marking error. When the identification tag is marked on the UWB module 100, the identification tag corresponding to other UWB modules 100 is marked on the current UWB module 100. If the identification tag is abnormal due to the above reasons, targeted correction can be carried out after identifying the above reasons.

At block 46, marking the UWB module 100 with a correct identification tag.

It can be understood that when it is determined that the cause of the abnormality is the identification tag marking error, the correct identification tag can be re marked to the UWB module 100. After the error on the identification tag is eliminated, another operation is performed on the UWB module 100.

At block 47, determining the calibration parameters for the UWB module 100 and storing the calibration parameters and the identity information.

For the UWB module 100 of the correct identification tag, the UWB module 100 is regarded as the UWB module 100 that has not completed the initialization of production, repeat the step of determining and writing the calibration parameters as described in block 21-23. Under the condition of saving additional manpower, the UWB module 100 can write the calibration parameters normally, so as to reduce the waste of the UWB module 100.

It can be understood that for the UWB module 100 with no abnormality in the identification tag, the reason why the obtained identity information is inconsistent with the currently read identity information may be that the storage error is caused by the interference of external signals during the storage of the identity information. The UWB module 100 can be regarded as a new UWB module 100 that has not been completed, repeat the step of determining and writing the calibration parameters as described in blocks 21-23. Under the condition of saving additional manpower, the UWB module 100 can write the calibration parameters normally, so as to reduce the waste of the UWB module 100.

Figure 5:
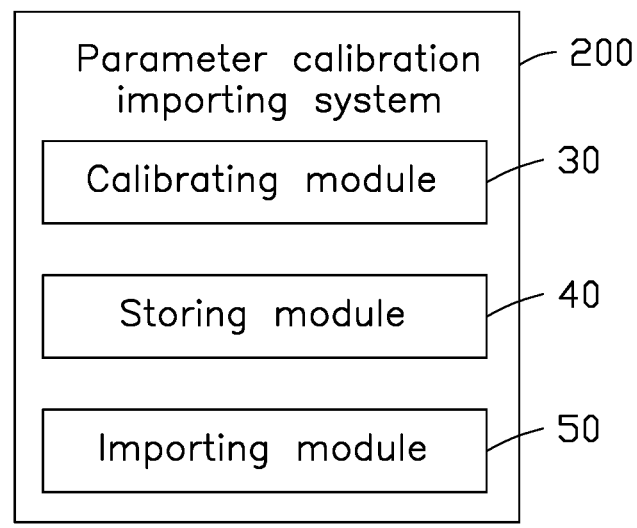
FIG. 5 is a schematic diagram of a parameter calibration importing system according to an embodiment of the present disclosure.

FIG. 5 is a schematic diagram of a parameter calibration importing system of the present disclosure.

The parameter calibration importing system 200 includes a calibrating module 30, a storing module 40, and importing module 50.

The calibrating module 30 is used to determine the calibration parameters of the UWB chip 10 according to the use requirements of the UWB module 100.

It can be understood that a plurality of the UWB chips 10 correspond to a plurality of different calibration parameters. Similarly, a plurality of the UWB modules 100 correspond to a plurality of different calibration parameters.

The calibration parameter is the RF parameter of the UWB module 100. The RF parameters can include but are not limited to UWB transmission power, signal frequency error value, delay time.

The storing module 40 is used to store the calibration parameters and the identity information.

It can be understood that the storage of the calibration parameters and the identity information can be permanent storage or a one-time storage that can be deleted immediately after reading the calibration parameters and the identity information, which is not limited in the embodiment of the present disclosure.

The importing module 50 is used to write the calibration parameters corresponding to the identity information into the UWB chip 10 corresponding to the identity information.

In the embodiment of the present disclosure, the importing module 50 writes the calibration parameters into the UWB chip 10 in the form of one-time writing.

It can be understood that the division of each module in the parameter calibration importing system 200 is only for illustration. In other embodiments, the parameter calibration importing system 200 can be divided into different modules as required to complete all or part of the functions of the above parameter calibration importing system 200.

In the embodiment of the present disclosure, the specific implementation of each module can also refer to the corresponding description of the method embodiment shown in FIGS. 1 to 4.

The parameter calibration importing system 200 described in FIG. 5 can store the calibration parameters after determining the calibration parameters. When the UWB module 100 is produced and determined as a good product, the calibration parameters are written into the UWB chip 10, and the UWB chip 10 on the UWB module 100 determined as a bad product can be recycled. The waste of the UWB chip 10 is reduced. For details, please refer to the specific embodiment of the above parameter calibration import method, which will not be described in detail here.

Figure 6:
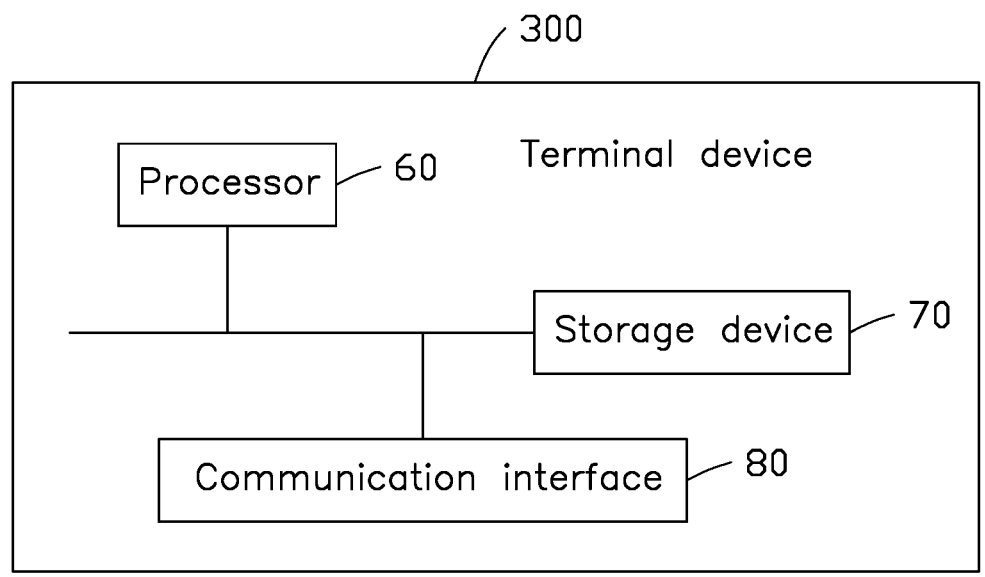
FIG. 6 is a schematic diagram of a terminal device according to an embodiment of the present disclosure.

FIG. 6 is a schematic diagram of a terminal device 300 of the present disclosure.

The embodiment of the present disclosure provides a terminal device 300. The terminal device 300 may include the parameter calibration importing system 200. For details of the parameter calibration importing system 200, please refer to the specific description of the embodiment shown in FIG. 5, which will not be repeated here.

As described in FIG. 6, the terminal device 300 may include a processor 60, a storage device 70, and a communication interface 80.

The processor 60, the storage device 70 and the communication interface 80 can be connected and communicate with each other through a communication bus.

The processor 60 may be a general central processing unit (CPU), a microprocessor, an application specific integrated circuit (ASIC), or one or more integrated circuits for controlling the execution of the above program.

The storage device 70 may be a read-only memory (ROM) or other types of static storage devices that can store static information and instructions, a random access memory (RAM) or other types of dynamic storage devices that can store information and instructions, or an electrically erasable programmable read-only memory (electrically erasable programmable read only memory, EEPROM), compact disc read only memory (CD-ROM) or other optical disc storage, optical disc storage (including compact disc, laser disc, optical disc, digital versatile disc, Blu ray disc, etc.), magnetic disk storage medium or other magnetic storage device, or any other medium that can be used to carry or store desired program code in the form of instruction or data structure and can be accessed by a computer, but is not limited thereto.

The storage device 70 may exist independently and be connected to the processor 60 through a bus. The storage device 70 may also be integrated with the processor 60.

The communication interface 80 is used to communicate with other devices or communication networks, such as Ethernet, wireless access network (RAN), wireless local area networks (WLAN).

The storage device 70 is used to store the application code executing the above scheme, and the execution is controlled by the processor 60. The processor 60 is used to execute the application code stored in the storage device 70. The code stored in the storage device 70 may perform some or all of the steps of the parameter calibration import method described in FIGS. 1 to 4.

The terminal device 300 shown in FIG. 6 can store the calibration parameters after determining the calibration parameters, write the calibration parameters into the UWB chip 10 when the UWB module 100 is produced and determined to be good, and recycle the UWB chip 10 on the UWB module 100 determined to be bad, the waste of the UWB chip 10 is reduced.

The embodiment of the present disclosure also provides a storage medium, which includes computer instructions. When the computer instructions run on the terminal device 300, the terminal device 300 executes the parameter calibration import method provided by the embodiment of the present application.

Those of ordinary skill in the art should realize that the above embodiments are only used to illustrate the present disclosure, but not to limit the present disclosure. As long as they are within the essential spirit of the present disclosure, the above embodiments are appropriately made. Changes and changes fall within the scope of protection of the present disclosure.

What is claimed is:

1. A parameter calibration importing method configured for importing calibration parameter into an ultra wideband (UWB) module, comprising:
    determining the calibration parameter according to requirements of the UWB module;
    storing the calibration parameter, wherein the calibration parameter is associated with identity information of the UWB module; and wherein when the calibration parameter is stored, the identity information is also stored;
    writing the calibration parameter into an UWB chip according to the identity information;
    obtaining the calibration parameter and a second identity information according to an identification tag;
    determining whether the second identity information is consistent with the identity information of the UWB module;
    writing the calibration parameter into the UWB module if the second identity information is consistent with the identity information of the UWB module;
    determining whether the identification tag of the UWB module is marked incorrectly, redetermining the calibration parameter and storing the calibration parameter if the identification tag of the UWB module is correct.

2. The parameter calibration importing method of claim 1, further comprising:
    determining basic parameters of the UWB module;
    determining parameter adjustment value according to the requirements of the UWB module; and
    obtaining the calibration parameter according to the basic parameter and the parameter adjustment value.

3. The parameter calibration importing method of claim 1, further comprising:
    if the second identity information is inconsistent with the identity information of the UWB module, then an exception notification signal is outputted.

4. The parameter calibration importing method of claim 3, further comprising:
    marking correct identification tag of the UWB module; and
    determining the calibration parameter if the identification tag of the UWB module is marked incorrectly.

5. A parameter calibration importing system configured for importing calibration parameter into an ultra wideband (UWB) module, comprising:
    a calibrating module used for determining the calibration parameter according to requirements of the UWB module;

a storing module used for storing the calibration parameter, wherein the calibration parameter is associated with identity information of the UWB module; and wherein when the calibration parameter is stored, the identity information is also stored;

an importing module used for writing the calibration parameter into an UWB chip according to the identity information;

wherein the calibrating module obtains the calibration parameter and a second identity information according to an identification tag, determines whether the second identity information is consistent with the identity information of the UWB module; and the importing module writes the calibration parameter into the UWB module if the second identity information is consistent with the identity information of the UWB module; and wherein the calibrating module determines whether the identification tag of the UWB module is marked incorrectly, and the calibrating module redetermines the calibration parameter and stores the calibration parameter if the identification tag of the UWB module is correct.

6. The parameter calibration importing system of claim 5, wherein the calibrating module determines basic parameters of the UWB module, determines parameter adjustment value according to the requirements of the UWB module, and obtains the calibration parameter according to the basic parameter and the parameter adjustment value.

7. The parameter calibration importing system of claim 5, wherein the calibrating module outputs an exception notification signal if the second identity information is inconsistent with the identity information of the UWB module.

8. The parameter calibration importing system of claim 7, wherein:
the calibrating module marks correct identification tag of the UWB module; and
determines the calibration parameter if the identification tag of the UWB module is marked incorrectly.

9. A terminal device, comprising:
a storage device; and
at least one processor, wherein the storage device stores one or more programs, when executed by the at least one processor, the one or more programs cause the at least one processor to:
determine the calibration parameter according to requirements of the UWB module;
store the calibration parameter, wherein the calibration parameter is associated with identity information of the UWB module; and
write the calibration parameter into an UWB chip according to the identity information;
obtain the calibration parameter and a second identity information according to an identification tag;
determine whether the second identity information is consistent with the identity information of the UWB module; and
write the calibration parameter into the UWB module if the second identity information is consistent with the identity information of the UWB module;
wherein the at least one processor further determines whether the identification tag of the UWB module is marked incorrectly, and redetermines the calibration parameter and stores the calibration parameter if the identification tag of the UWB module is correct.

10. The terminal device of claim 9, wherein the at least one processor is further caused to:
determine basic parameters of the UWB module;
determine parameter adjustment value according to the requirements of the UWB module; and
obtain the calibration parameter according to the basic parameter and the parameter adjustment value.

11. The terminal device of claim 9, wherein the at least one processor further outputs an exception notification signal if the second identity information is inconsistent with the identity information of the UWB module.

12. The terminal device of claim 11, wherein the at least one processor further
marks correct identification tag of the UWB module; and
determines the calibration parameter if the identification tag of the UWB module is marked incorrectly.

* * * * *